(12) United States Patent
Suzuki

(10) Patent No.: US 7,865,256 B2
(45) Date of Patent: Jan. 4, 2011

(54) AUDIO PLAYBACK APPARATUS

(75) Inventor: Toshihiko Suzuki, Hamamatsu (JP)

(73) Assignee: Yamaha Corporation (JP)

( * ) Notice: Subject to any disclaimer, the term of this patent is extended or adjusted under 35 U.S.C. 154(b) by 1068 days.

(21) Appl. No.: 11/555,382

(22) Filed: Nov. 1, 2006

(65) Prior Publication Data
US 2007/0116301 A1 May 24, 2007

(30) Foreign Application Priority Data

| Nov. 4, 2005 | (JP) | ............................ 2005-320535 |
| Feb. 22, 2006 | (JP) | ............................ 2006-045153 |

(51) Int. Cl.
G06F 17/00 (2006.01)

(52) U.S. Cl. ....................................................... 700/94

(58) Field of Classification Search ................... 700/94; 704/500–504
See application file for complete search history.

(56) References Cited

U.S. PATENT DOCUMENTS

| 6,822,153 B2 * | 11/2004 | Comair et al. ................. 84/609 |
| 7,433,574 B2 * | 10/2008 | Nakano et al. ................. 386/39 |
| 2002/0114610 A1 * | 8/2002 | Nakano et al. ................. 386/39 |
| 2002/0169599 A1 | 11/2002 | Toshihiko |
| 2003/0163679 A1 * | 8/2003 | Ganapathy et al. ........... 712/241 |
| 2003/0227473 A1 * | 12/2003 | Shih et al. .................... 345/716 |
| 2006/0027079 A1 * | 2/2006 | Uehara .......................... 84/609 |

FOREIGN PATENT DOCUMENTS

JP 3601473 B2 10/2004

* cited by examiner

Primary Examiner—Andrew C Flanders
(74) Attorney, Agent, or Firm—Rossi, Kimms & McDowell LLP

(57) ABSTRACT

An audio playback apparatus realizes both of normal playback and loop playback with respect to compressive coded data forming an audio waveform of one phrase, which is constituted by a string of samples and which includes a loop section. In the normal playback, a decoder sequentially reproduces the samples. In the loop playback, the decoder sequentially reproduces the samples until a sample preceding a loop start point, then, the decoder repeatedly reproduces the samples belonging to the loop section, then, the decoder sequentially reproduces the samples started from the loop start point. Alternatively, two decoders are alternately controlled to perform decoding in the loop playback. Thus, it is possible to reliably output all the samples including the samples of the loop section without causing breaks.

6 Claims, 7 Drawing Sheets

FIG. 7
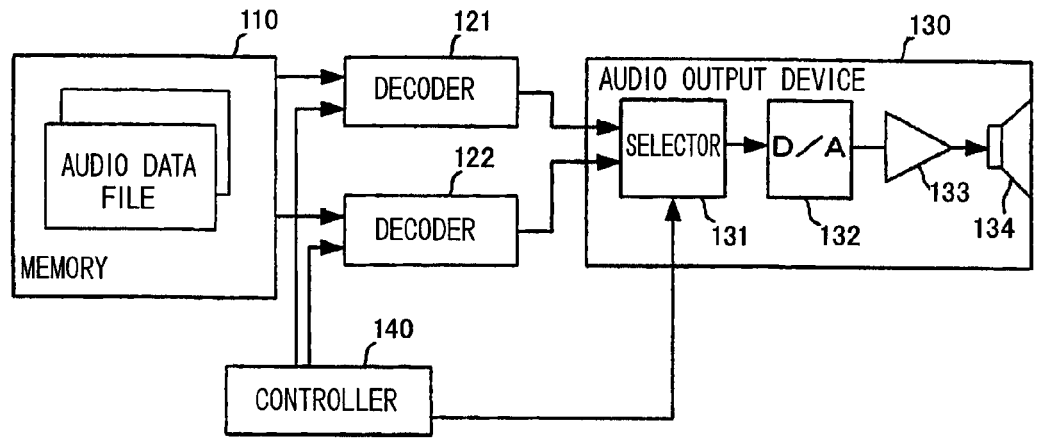
FIG. 8A
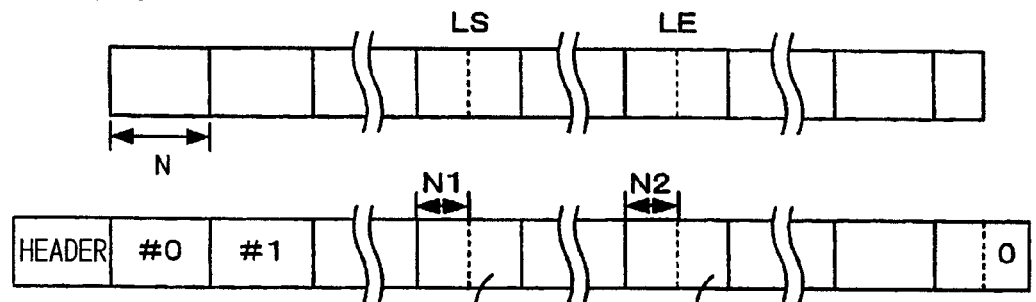
FIG. 8B
FIG. 9A
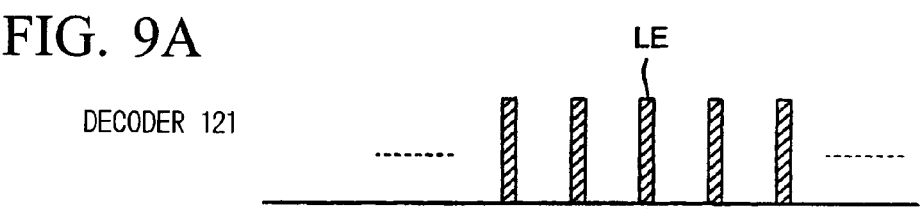
FIG. 9B
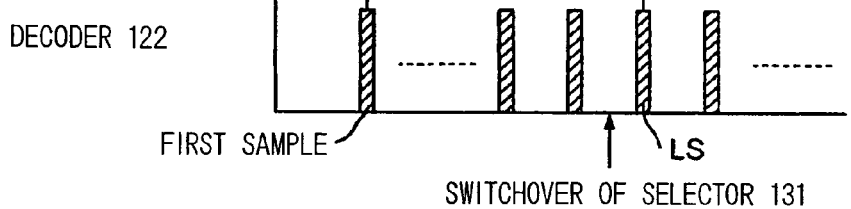

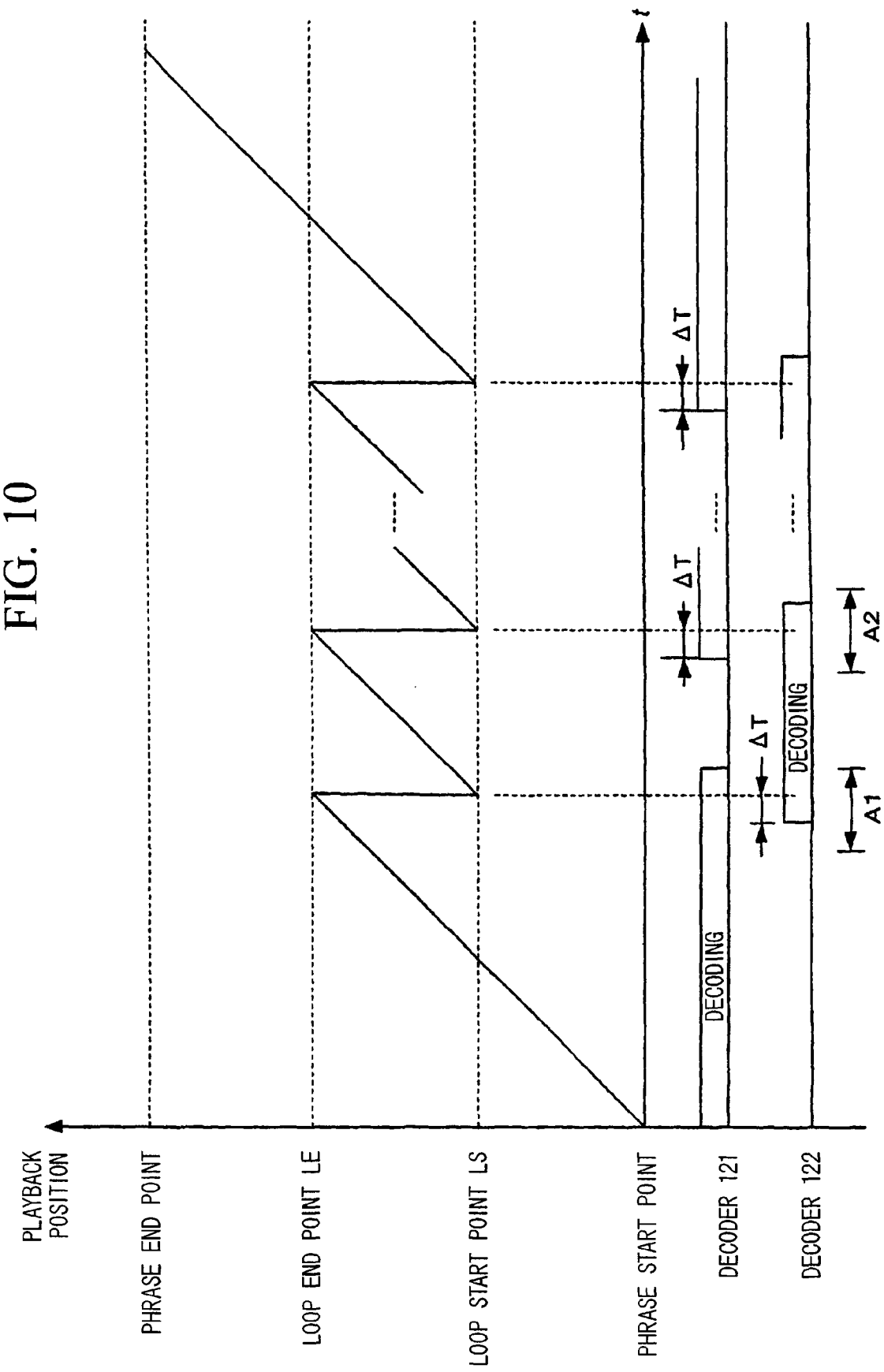

AUDIO PLAYBACK APPARATUS

BACKGROUND OF THE INVENTION

1. Field of the Invention

The present invention relates to audio playback apparatuses that decode and reproduce audio data subjected to compressive coding.

This application claims priority on Japanese Patent Application No. 2005-320535 and Japanese Patent Application No. 2006-45153, the contents of which are incorporated herein by reference.

2. Description of the Related Art

Recently, a variety of coding and decoding techniques such as MP3 (MPEG Audio Layer-3) and AAC (Advanced Audio Coding) have been developed and widely used in audio playback apparatuses.

Game devices are designed in different concepts compared with CD players and broadcasting systems because of loop playback functions (or loop reproduction functions) in which prescribed portions of phrases of musical tunes or sounds are repeatedly played back and reproduced. Game devices frequently play back audio data subjected to compressive coding (hereinafter, simply referred to as compressive coded data) by way of loop playback functions. In the known audio technology such as MP3, an audio waveform of one phrase (constituted by a string of samples) is divided into a plurality of blocks, so that compressive coding is performed in units of blocks. Herein, a start point and an end point of a loop are set to a string of samples forming a block (hereinafter, simply referred to as a sample string). This raises a difficulty in smoothly and repeatedly playing back the sample string with respect to the loop defined between the start point and the end point without causing breaks. The loop playback can be realized by way of a method in which one phrase is divided into three sections, namely, a first section formed before the start point of a loop, a second section actually subjected to loop playback, and a third section formed after the end point of the loop, wherein compressive coding is performed on the first, second, and third sections respectively so as to produce three sets of compressive coded data. However, this method causes a problem in that, during the execution of the normal playback different from the loop playback, an unexpected break may occur in the playback of the sample string due to the transition of decoding from one section to the next section. Japanese Patent No. 3601473 teaches a technology regarding loop playback for decoding compressive coded data. This technology realizes the playback of audio data of one phrase without causing breaks; however, it does not realize the loop playback with respect to a desired section extracted from one phrase of an audio waveform.

SUMMARY OF THE INVENTION

It is an object of the present invention to provide an audio device that performs loop playback with respect to compressive coded data of a desired section extracted from one phrase of an audio waveform and that also performs normal playback, which differs from the loop playback, with respect to the compressive coded data without causing breaks.

In a first aspect of the present invention, an audio playback apparatus includes a memory for storing compressive coded data, which are produced by performing compressive coding on a string of samples forming an audio waveform of one phrase, which is defined between a phrase start point and a phrase end point and which includes a loop section defined between a loop start point and a loop end point; at least one decoder for decoding the compressive coded data so as to sequentially reproduce the samples; and a controller for controlling the decoder in such a way that upon reception of a normal playback instruction, the decoder sequentially decodes the compressive coded data, and upon reception of a loop playback instruction, the decoder sequentially decodes the compressive coded data so as to reproduce and output the samples lying between the phrase start point and the loop start point, then, the decoder repeatedly decodes the compressive coded data belonging to the loop section so as to repeatedly reproduce the samples lying between the loop start point and the loop end point, then, the decoder restarts decoding on the compressive coded data so as to sequentially reproduce the samples lying between the loop end point and the phrase end point, thus outputting the samples started from the loop start point.

In the normal playback, the decoder sequentially decodes the compressive coded data so as to sequentially reproduce the samples except for the samples belonging to the loop section; thus, it is possible to reproduce the samples forming one phrase of an audio waveform without causing breaks. In the loop playback, after the decoder reproduces the samples lying between the phrase start point and the loop start point, the decoder repeatedly reproduces the samples lying between the loop start point and the loop end point. Then, the decoder restarts reproducing the samples, thus reliably outputting the samples started from the loop start point. This makes it possible for the decoder to reliably reproduce the samples without causing breaks in the loop playback.

In a second aspect of the present invention, an audio playback apparatus includes a memory for storing compressive coded data, which are produced by way of compressive coding performed on a string of samples forming an audio waveform of one phrase, which is divided into a plurality of blocks and is defined between a phrase start point and a phrase end point and which includes at least one loop section defined between a loop start point and a loop end point, wherein the compressive coding is performed in units of the blocks; a first decoder; a second decoder; and a controller for controlling the first decoder and the second decoder so as to decode the compressive coded data, wherein upon reception of a loop playback instruction, the controller controls the first decoder to start decoding on the compressive coded data so as to reproduce the samples started from the phrase start point, then, the controller alternately controls the first decoder and the second decoder so as to repeatedly reproduce the samples belonging to the loop section a predetermined number of times, and wherein the second decoder starts decoding of the compressive coded data of the block including the loop start point before the first decoder reproduces the sample of the loop end point in such a way that subsequent to the reproduction of the sample of the loop end point by means of the first decoder, the second decoder starts reproducing the samples started from the loop start point without delay.

BRIEF DESCRIPTION OF THE DRAWINGS

These and other objects, aspects, and embodiments of the present invention will be described in more detail with reference to the following drawings, in which:

FIG. 7 is a block diagram showing the constitution of an audio playback apparatus in accordance with a second embodiment of the present invention;

FIG. 8A diagrammatically shows a series of blocks forming a sample string including a loop section defined between a loop start point and a loop end point;

FIG. 8B diagrammatically shows the overall configuration of the sample string, which is preceded by a header and is terminated by 0s;

FIG. 9A is a time chart realizing return operation from the loop end point to the loop start point by way of decoding of one decoder;

FIG. 9B is a time chart realizing return operation from the loop end point to the loop start point by way of decoding of the other decoder;

FIG. 10 is a time chart showing one example of the loop playback realized by the audio playback apparatus of FIG. 7.

DESCRIPTION OF THE PREFERRED EMBODIMENTS

The present invention will be described in further detail by way of examples with reference to the accompanying drawings.

1. FIRST EMBODIMENT

Figure 1:
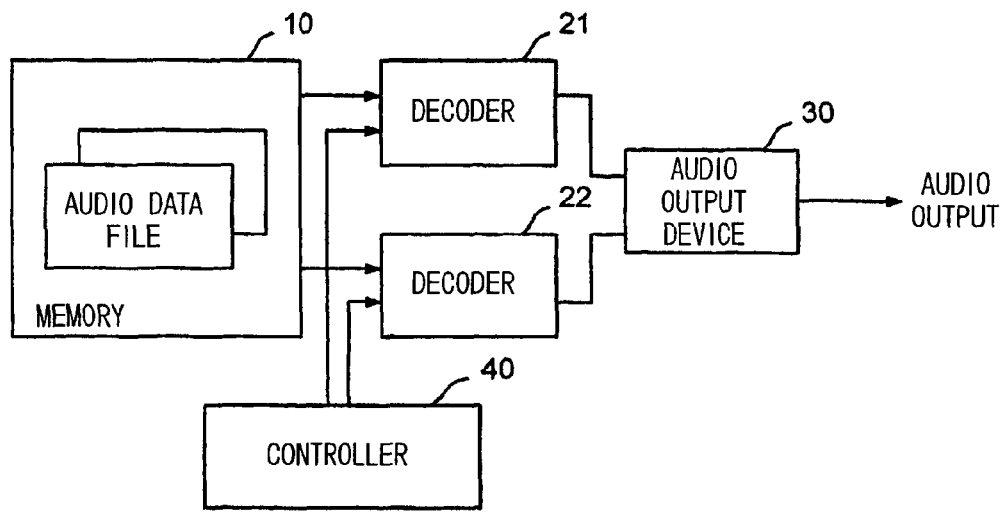
FIG. 1 is a block diagram showing the constitution of an audio playback apparatus in accordance with a first embodiment of the present invention.

FIG. 1 is a block diagram showing the constitution of an audio playback apparatus in accordance with a first embodiment of the present invention. In FIG. 1, a memory 10 stores a variety of audio data files, which are formed using compressive coded data that are produced by performing compressive coding on sample strings of audio waveforms in accordance with prescribed compressive coding algorithms such as MP3. Decoders 21 and 22 respectively perform decoding on compressive coded data read from the memory 10, thus reproducing sample strings of audio waveforms. An audio output device 30 is constituted by a digital-to-analog converter (or a D/A converter) for converting sample strings output from either the decoder 21 or the decoder 22 into analog signals, an amplifier for amplifying the analog signals output from the D/A converter, and a speaker for producing sound based on the output signal of the amplifier.

A controller 40 is constituted by a ROM for storing a variety of programs, a CPU for executing programs stored in the ROM, and a RAM serving as a work area used by the CPU. One program executed by the CPU is a game application program, which makes the decoders 21 and 22 decode compressive coded data, which are included in the audio data files stored in the memory 10, thus reproducing sounds.

Figure 2A:
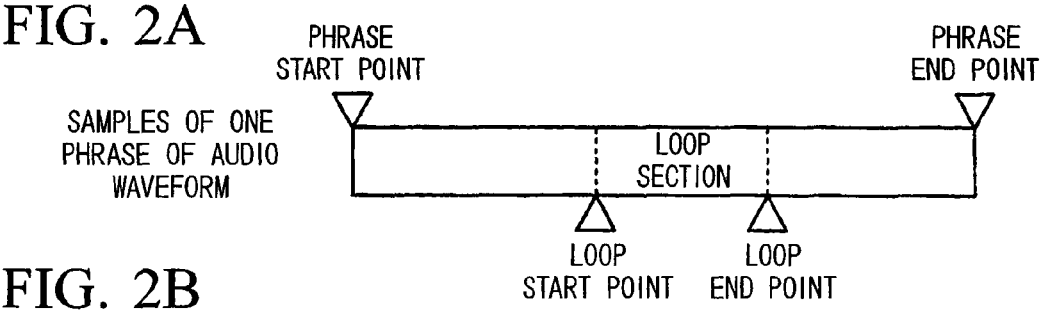
FIG. 2A diagrammatically shows compressive coded data with respect to a sample string forming one phrase of an audio waveform.
Figure 2B:
FIG. 2B diagrammatically shows compressive coded data of track 1 subjected to normal playback.
Figure 2C:
FIG. 2C diagrammatically shows compressive coded data of track 2 subjected to loop playback.

One technical feature of the present invention is the content of compressive coded data included in the audio data file, which will be described in detail with reference to FIGS. 2A, 2B, and 2C. One audio data file stores compressive coded data with respect to track 1 and track 2, wherein the compressive coded data are produced from a sample string forming one phrase of an audio waveform by way of the prescribed compressive coding algorithm such as MP3. As shown in FIG. 2A, a prescribed portion of the sample string of one phrase subjected to loop playback is selected as a loop section. As shown in FIG. 2B, the compressive coded data of track 1 are produced by way of compressive coding performed on the sample string of one phrase defined between a phase start point and a phrase end point. As shown in FIG. 2C, the compressive coded data of track 2 are produced by way of compressive coding performed on the prescribed portion of the sample string of one phrase defined between a loop start point and a loop end point.

Another technical feature of the present embodiment is the controller 40, whose CPU controls the decoders 21 and 22 in accordance with the game application program. Hereinafter, the present embodiment will be described in detail mainly with respect to the operation of the controller 40.

The game application program is directed to the playback of the compressive coded data included in the audio data file, wherein it includes a normal playback command and a loop playback command. In the execution of the normal playback command or the loop playback command, the controller 40 controls the decoders 21 and 22 in different manners.

First, when a certain audio data file is subjected to normal playback so as to execute the normal playback command therefor, the controller 40 controls the decoder 21 to decode the compressive coded data of track 1 included in the audio data file, thus reproducing a sample string forming one phrase of an audio waveform, so that the reproduced sample string is supplied to the audio output device 30. As a result, the audio output device 30 outputs an effect-imparted sound of one phrase without causing breaks.

Figure 3:
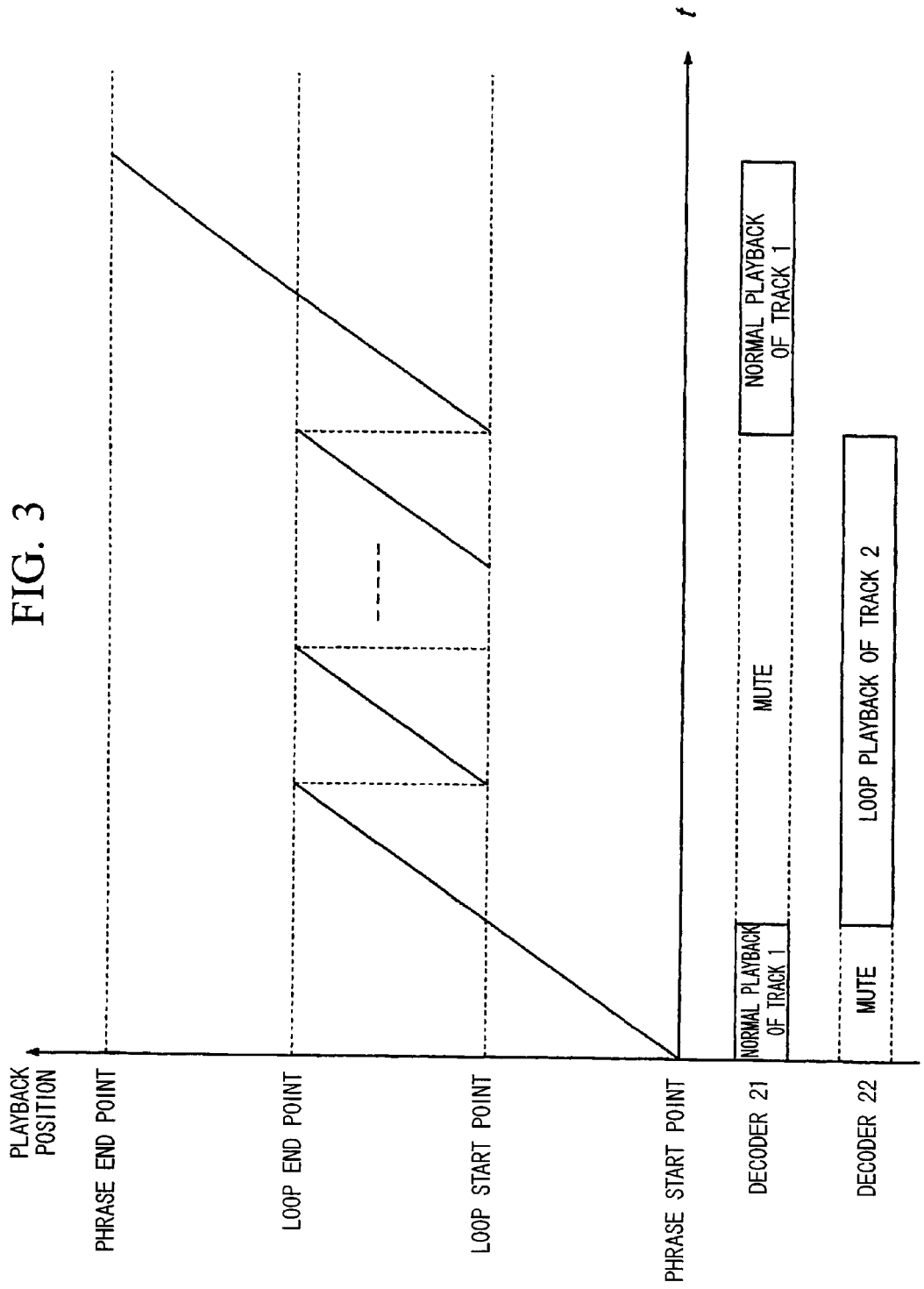
FIG. 3 is a time chart showing the overall operation of the audio playback apparatus of FIG. 1.

Next, the operation of the controller 40, which executes a loop playback command with respect to a certain audio data file, will be described in detail with reference to FIG. 3. The controller 40 sends a playback instruction to the decoder 21 so as to decode compressive coded data of track 1 included in the audio data file subjected to loop playback. In addition, the controller 40 sends a playback instruction to the decoder 22 so as to decode compressive coded data of track 2 included in the audio data file, and it also sends a MUTE instruction to the decoder 22. Upon reception of the playback instruction, the decoder 21 starts to perform decoding on the compressive coded data of track 1 so as to reproduce samples, which are supplied to the audio output device 30. Upon reception of the playback instruction and the MUTE instruction, the decoder 22 starts to perform decoding on the compressive coded data of track 2. In order to compensate for a delay time of the decoding of the decoder 22, which ranges from the reception timing of the playback instruction and the output timing of samples, the decoder 21 stops decoding and is thus placed in a MUTE state after producing a prescribed number of samples (e.g., Fs·TD samples where TD designates the delay time, and Fs designates the sampling frequency), wherein the decoder holds the prescribed number of samples for a while.

The decoder 21 continuously decodes the compressive coded data of track 1 until it outputs a sample preceding the loop start point. Until then, the audio output device 30 outputs sound based on the samples consecutively output from the decoder 21. When the decoder 21 outputs the sample preceding the loop start point, the controller 40 sends a MUTE instruction to the decoder 21 so as to realize the transition to the MUTE state, and it also sends a repetitive playback instruction to the decoder 22 so as to perform repetitive decoding of the compressive coded data of track 2.

Upon reception of the MUTE instruction, the decoder 21 holds the stored contents of all registers used for the decoding thereof (hereinafter, simply referred to as an internal state of the decoder 21), thus stopping outputting samples to the audio output device 30. Upon reception of the repetitive playback instruction, the decoder 2, which is once placed in a MUTE state, starts decoding the compressive coded data of track 2. In the MUTE state, the decoder 21 holds the prescribed number of samples so as to compensate for the delay time of the decoding of the decoder 22. For this reason, upon reception of the playback instruction, the decoder 21 outputs the held samples without delay and subsequently performs decoding so as to reproduce samples. The decoder 22 repeatedly decodes the compressive coded data of track 2 in such a way that after completion of the decoding of track 2 from the top portion to the end portion, the decoding is started again from the top portion of track 2. Thus, the decoder 22 repeatedly outputs the sample string defined between the loop start point and the loop end point. The controller 40 issues the loop playback command including the information designating the number of times of repetitive decoding of the compressive coded data of track 2. Therefore, the controller 40 controls the decoder 22 to repeatedly decode the compressive coded data of track 2 the number of times of repetitive decoding, which is designated by the aforementioned information. During the execution of the loop playback command, the audio output device 30 repeatedly outputs the sample string, which is repeatedly output from the decoder 22 and which is defined between the loop start point and the loop end point.

After completion of the repetitive decoding of the compressive coded data of track 2, in which the decoder 22 repeatedly decodes the compressive coded data of track 2 the designated number of times, the controller 40 sends a MUTE instruction to the decoder 22, and it also sends a playback restart instruction to the decoder 21. Upon reception of the MUTE instruction, the decoder 22 is placed in the MUTE state. Upon reception of the playback restart instruction, the decoder 21 restarts decoding of the compressive coded data of track 1. Herein, the decoder 21 restarts decoding with the internal state thereof, which is held at the transition to the MUTE state; hence, playback can be restarted without delay, so that the decoder 21 immediately outputs the sample of the loop start point. Thus, the decoder 21 sequentially outputs samples defined between the loop start point and the phrase end point, so that the audio output device 30 correspondingly outputs sound.

As described above, the audio playback apparatus of the present embodiment decodes the compressive coded data of track 1 extracted from the sample string of one phrase in the normal playback; hence, it is possible to smoothly reproduce effect-imparted sound without breaks. In the loop playback, after the sample preceding the loop start point is reproduced by means of the decoder 21 decoding the compressive coded data of track 1, the decoder 22 performs repetitive decoding on the compressive coded data of track 2, which are prepared in advance for the loop playback; then, the decoder 21 restarts decoding of the compressive coded data of track 1. This allows the audio playback apparatus to perform loop playback at a desired point in the sample string of one phrase. Specifically, the present embodiment is designed such that the decoder 22 decoding the compressive coded data of track 2 is once placed in the MUTE state, then, after the sample preceding the loop start point is reproduced by means of the decoder 21 decoding the compressive coded data of track 1, the decoder 22 is controlled to restart decoding of the compressive coded data of track 2. Hence, it is possible to start reproducing the samples included in the loop without delay. In addition, when the decoder 21 decoding the compressive coded data of track 1 reproduces the sample preceding the loop start point, it holds the internal state thereof and is placed in the MUTE state; thereafter, after the decoder 22 ends the repetitive decoding of the compressive coded data of track 2 so as to end the loop playback, it is possible to restart the normal playback without delay. That is, it is possible to sequentially perform the loop playback and the normal playback without breaks.

Figure 4:
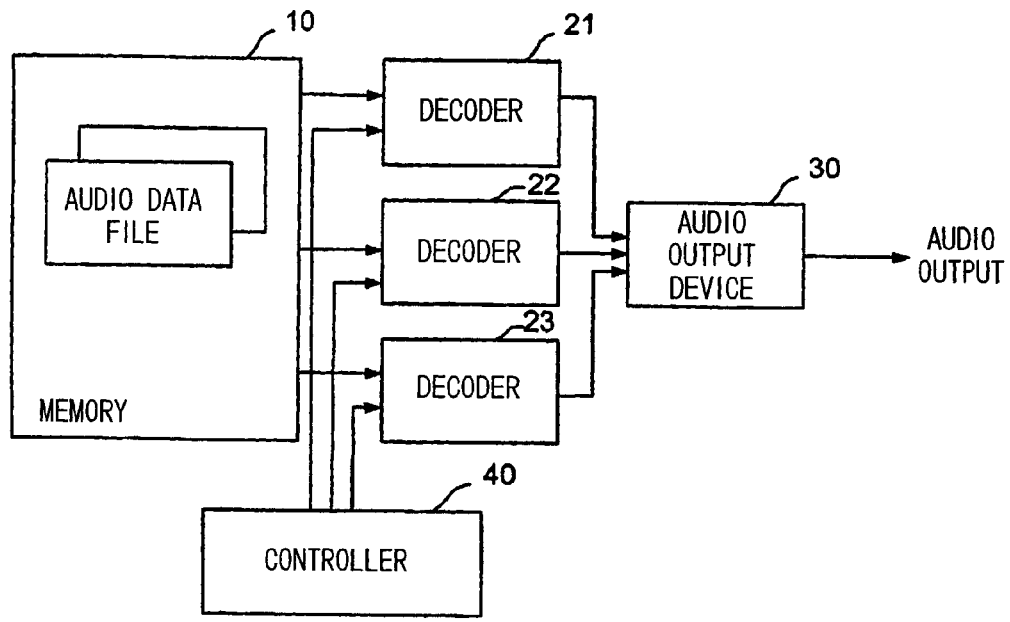
FIG. 4 is a block diagram showing the constitution of an audio playback apparatus, which is partially modified in comparison with the audio playback apparatus of FIG. 1.
Figure 5A:
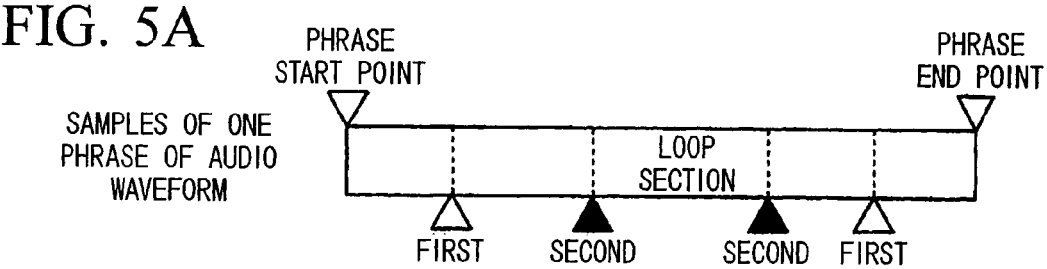
FIG. 5A diagrammatically shows compressive coded data with respect to a sample string forming one phrase of an audio waveform.
Figure 5B:
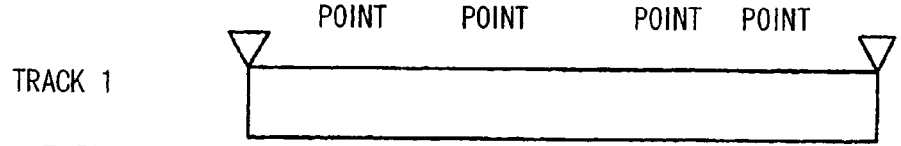
FIG. 5B diagrammatically shows compressive coded data of track 1 subjected to normal playback.
Figure 5C:
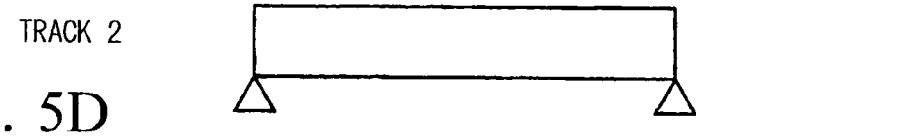
FIG. 5C diagrammatically shows compressive coded data of track 2 subjected to loop playback.
Figure 5D:
FIG. 5D diagrammatically shows compressive coded data of track 3 subjected to loop playback.

The audio playback apparatus of FIG. 1 can be modified as shown in FIG. 4, in which parts identical to those shown in FIG. 1 are designated by the same reference numerals. Compared with the audio playback apparatus of FIG. 1, the audio playback apparatus of FIG. 4 also has a decoder 23 in addition to the decoders 21 and 22. Herein, one audio data file stores three sets of compressive coded data with respect to three tracks, i.e., track 1, track 2, and track 3, wherein the compressive coded data are produced by way of the compressive coding algorithm such as MP3, which is effected on a sample string forming one phrase of an audio waveform representing an effect-imparted sound, for example. As shown in FIG. 5A, the sample string forming one phrase of an audio waveform includes a first loop section, which further includes a second loop section smaller than the first loop section. FIG. 5B diagrammatically shows compressive coded data of track 1, which are produced by performing compressive coding on the sample string defined between the phrase start point and the phrase end point. FIG. 5C diagrammatically shows compressive coded data of track 2, which are produced by performing compressive coding on the sample string included in the first loop section defined between the loop start point and the loop end point. FIG. 5D diagrammatically shows compressive coded data of track 3, which are produced by performing compressive coding on the sample string included in the second loop section defined between the loop start point and the loop end point.

Figure 6:
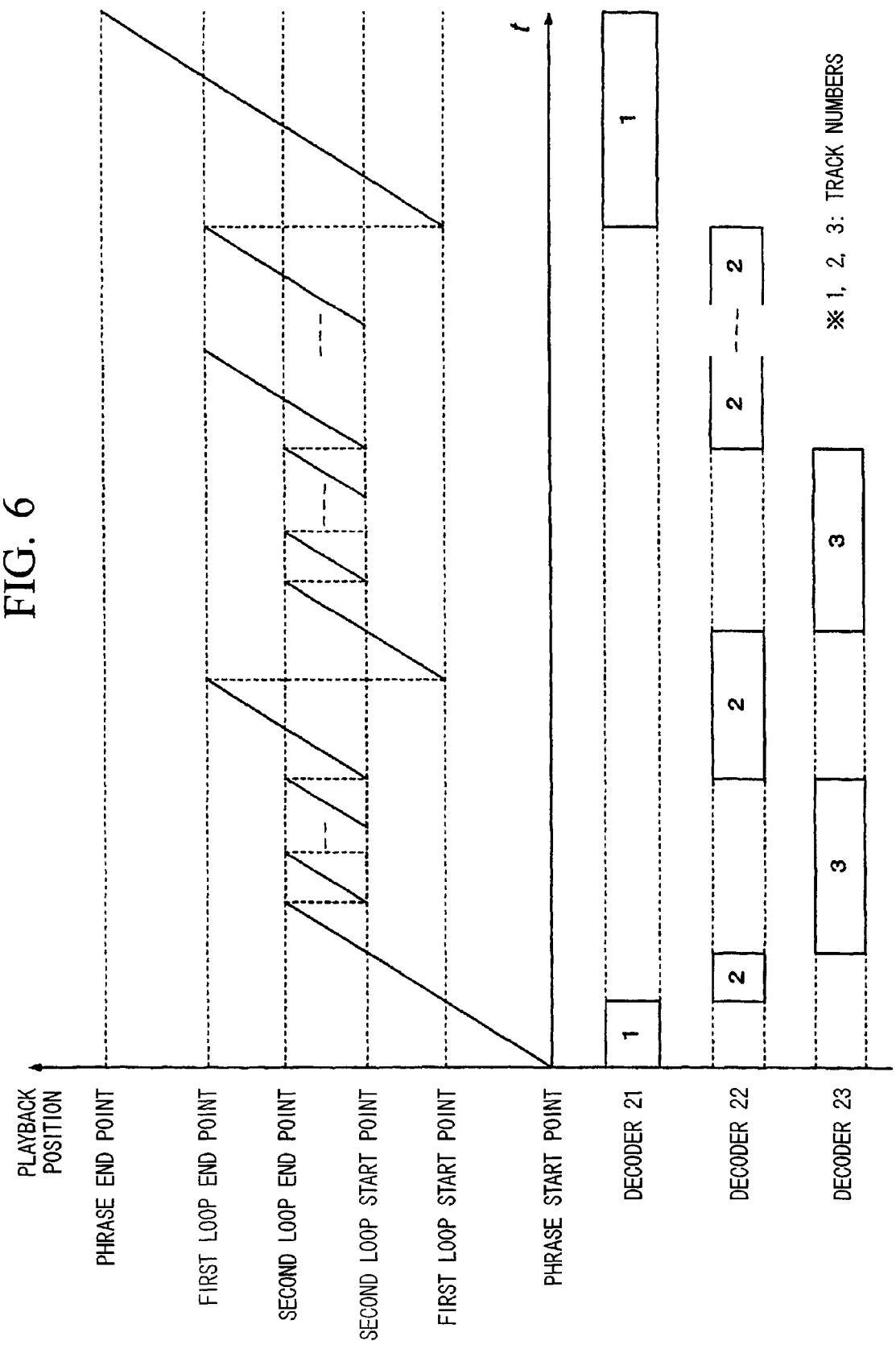
FIG. 6 is a time chart showing the overall operation of the audio playback apparatus of FIG. 4.

Similar to the audio playback apparatus of FIG. 1, the audio playback apparatus of FIG. 4 performs the normal playback with respect to the compressive coded data of track 1 under the control of the controller 40. In addition, the audio playback apparatus of FIG. 4 performs the loop playback on the compressive coded data belonging to the loop section. Herein, the first loop section is repeatedly subjected to loop playback a first number of times during the playback of one phrase, and the second loop section is repeatedly subjected to loop playback a second number of times during a single loop playback of the first loop section. This will be explained with reference to FIG. 6.

In the playback of one phrase, the decoder 21 is firstly activated to start decoding the compressive coded data of track 1, so that the decoder 21 sequentially reproduces and outputs samples ranging from the sample of the phrase start point to the sample preceding the loop start point of the first loop section; then, it is placed in a MUTE state.

Next, the decoder 22 is activated to start decoding the compressive coded data of track 2, so that the decoder 22 sequentially reproduces and outputs samples ranging from the sample of the loop start point of the first loop section to the sample preceding the loop start point of the second loop section; then, it is placed in a MUTE state. Next, the decoder 23, which is initially placed in a MUTE state, is activated to start decoding on the compressive coded data of track 3, so that the decoder 23 repeatedly reproduces and outputs samples lying between the loop start point and loop end point of the second loop section the second number of times. After completion of the repetitive decoding of the track 3, the decoder 23 is placed in a MUTE state; alternatively, the decoder 22 is activated to restart decoding on the compressive coded data of track 2, so that the decoder 22 sequentially reproduces and outputs samples lying between the loop start point of the second loop section and the loop end point of the first loop section. Next, the decoder 22 sequentially reproduces and outputs samples lying between the loop start point of the first loop section and the loop start point of the second loop section; then, it is placed in a MUTE state.

Next, the decoder 23 is activated again so as to restart decoding on the compressive coded data of track 3, so that the decoder 23 repeatedly reproduces and outputs samples included in the second loop section the second number of times. After completion of the loop playback of the second loop section, the decoder 23 is placed in a MUTE state; alternatively, the decoder 22 is activated again so as to restart decoding on the compressive coded data of track 2.

A series of decoding processes described above are repeated. That is, the decoder 22 is activated again so as to perform the loop playback with respect to the first loop section; and during the loop playback of the first loop section, the decoder 23 is activated again so as to repeatedly perform the loop playback with respect to the second loop section the second number of times. Thereafter, after completion of the repeated loop playback of the first loop section by means of the decoder 22, the decoder 21 is activated again so as to restart decoding on the compressive coded data of track 1, so that the decoder 21 sequentially reproduces and outputs samples lying between the loop start point of the first loop section and the phrase end point. Thus, the audio playback apparatus of FIG. 4 can demonstrate effects similar to those of the audio playback apparatus of FIG. 1.

The audio playback apparatus of the present embodiment is not necessarily limited to ones shown in FIGS. 1 and 4; hence, it is possible to create other variations and modifications, which will be described below.

(1) The audio playback apparatus of FIG. 1 is designed to cope with a single loop section included in one phrase, wherein it is possible to arrange a plurality of loop sections at different positions in one phrase. That is, in addition to the compressive coded data of track 1, which are produced by performing compressive coding on the sample string of one phrase, the compressive coded data of track 2 are arranged with respect to each of the loop sections. In the normal playback, the decoder 21 is activated to perform decoding on the compressive coded data of track 1. In the loop playback, the decoder 22 is activated to perform decoding on the compressive coded data with respect to each of the loop sections.

(2) In the above, the compressive coded data subjected to loop playback are extracted from the compressive coded data forming the sample string of one phrase; however, they are not necessarily and strictly identical to a part of the compressive coded data forming the sample string of one phrase. Alternatively, it is possible to introduce other compressive coded data subjected to loop playback irrespective of the sample string of one phrase.

(3) In the above, a plurality of decoders are used not to cause unexpected breaks between the normal playback and loop playback. However, if a high sound quality is not strictly required in the loop playback, it is possible to use only one decoder with respect to decoding of compressive coded data of plural tracks, wherein the decoder sequentially performs decoding with respect to both of the normal playback and loop playback.

(4) Upon reception of loop playback instructions, the audio playback apparatus of FIG. 4 performs loop playback with respect to both of the first loop section and the second loop section. Instead, it is possible to perform loop playback with respect to either the first loop section or the second loop section in response to the type of the loop playback instruction. Specifically, the audio playback apparatus of FIG. 4 can be modified to achieve three types of loop playback instructions as follows:
 (a) Loop playback of the first and second loop sections, which is described above in conjunction with FIG. 6.
 (b) Loop playback of the first loop section only.
 (c) Loop playback of the second loop section only.

2. SECOND EMBODIMENT

FIG. 7 is a block diagram showing the constitution of an audio playback apparatus in accordance with a second embodiment of the present invention. In FIG. 7, a memory 110 stores a variety of audio data files, each of which describes compressive coded data that are produced by way of a compressive coding algorithm such as MP3 effected on the sample string forming an audio waveform of one phrase representing an effect-imparted sound, for example.

The present embodiment uses the compressive coding algorithm as shown in FIG. 8A, in which the sample string of one phrase is divided into blocks each consisting of N samples (where N is a predetermined integer), wherein compressive coding is performed in units of blocks. When one phrase is formed by the sample string including a plurality of samples, the number of which is not identical to the integral multiple of N, the sample string is partially modified such that 0s are added to the last sample included in the sample string so as to compulsorily make one phrase include the integral multiple of N samples; then, compressive coding is performed on the modified sample string.

One phrase of the sample string subjected to compressive coding includes a loop section subjected to loop playback. In FIG. 8A, the loop section is defined between a loop start point LS and a loop end point LE. Normally, both of the loop start point LS and the loop end point LE are set in the middle of blocks. When the number of samples lying between the phrase start point and the loop start point LS is denoted as NLS, the number NBS assigned to the block including the sample of the loop start point LS is calculated as an integral part, which is produced by dividing NLS by N, as follows:

$$NBS = INT(NLS/N) \tag{1}$$

Similarly, when the number of samples lying between the phrase start point and the loop end point LE is denoted as NLE, the number NBE assigned to the block including the sample of the loop end point LE is calculated as an integral part, which is produced by dividing NLE by N, as follows:

$$NBE = INT(NLE/N) \tag{2}$$

In addition, when the number of samples counted from the first sample to the sample of the loop start point LS in the block including the sample of the loop start point LS is denoted as N1, the number N1 is calculated as a remainder, which is produced by dividing NLS by N, as follows:

$$N1 = MOD(NLS, N) \quad (3)$$

Similarly, the number of samples counted from the first sample to the sample of the loop end point LE in the block including the loop end point LE is denoted as N2, the number N2 is calculated as a remainder, which is produced by dividing NLE by N, as follows:

$$N2 = MOD(NLE, N) \quad (4)$$

FIG. 8B shows a series of compressive coded data that are produced by way of compressive coding. Herein, #k (where k=0, 1, ...) denotes the compressive coded data of block k (where k=0, 1, ...) extracted from the sample string. A header including various pieces of control information is added at the top position preceding a series of blocks each describing compressive coded data. That is, the header includes the data NLS representing the loop start point LS and the data NLE representing the loop end point LE.

In FIG. 7, decoders 121 and 122 perform decoding on compressive coded data under the control of a controller 140, thus reproducing sample strings at a prescribed sampling frequency. An audio output device 130 includes a selector 131, which selects one of the sample strings output from the decoders 121 and 122 under the control of the controller 140, a digital-to-analog converter (or a D/A converter) 132 for converting the sample string selected by the selector 131 into an analog signal, an amplifier 133 for amplifying the analog signal output from the D/A converter 132, and a speaker 134 for producing sound based on the output signal of the amplifier 133.

The controller 140 includes a ROM for storing a variety of programs, a CPU for executing programs stored in the ROM, and a RAM serving as a work area for the CPU. One program executed by the CPU is a game application program, which makes the decoders 121 and 122 decode the compressive coded data stored in the audio data file (which is stored in the memory 110), thus producing sound by way of the audio output device 130.

The present embodiment has outstanding technical features, i.e., the decoding of the decoders 121 and 122 and the control of the audio output device 130 in accordance with the game application program executed by the CPU of the controller 140. The game application program includes both of a normal playback command and a loop playback command with respect to the playback of the compressive coded data described in the audio data file. In response to the normal playback command and the loop playback command, one of which is selectively executed, the controller 140 controls the decoders 121 and 122 and the audio output device 130 in different manners.

When the normal playback command is executed, the controller 140 controls the decoder 121 to decode the compressive coded data of the audio data file subjected to normal playback, thus reproducing the sample string forming an audio waveform of one phrase, which is then supplied to the audio output device 130.

When the loop playback command is executed, the controller 140 controls either the decoder 121 or the decoder 122 to start decoding on the compressive coded data in order to reproduce a string of samples started from the phase start point, wherein it uses the decoders 121 and 122 alternately so as to perform decoding realizing the repetitive playback of a string of samples lying between the loop start point LS and the loop end point LE by a prescribed number of times.

In the above, the controller 140 alternately controls the decoders 121 and 122 in such a way that, before one decoder reproduces the sample of the loop end point LE, the other decoder starts decoding on the compressive coded data of the block including the sample of the loop start point LS, whereby subsequent to the reproduction of the sample of the loop end point LE by means of one decoder, the other decoder can smoothly reproduce a string of samples started from the loop start point LS. The controller 140 performs switchover control on the selector 131 of the audio output device 130 in such a way that, after the selector 131 selects a string of samples, which are reproduced by one decoder and are ended at the loop end point LE, the selector 131 selects a string of samples, which are reproduced by the other decoder and are started from the loop start point LS. The present embodiment is characterized in that the reproduction position is returned from the loop end point LE to the loop start point LS.

The aforementioned return operation of the reproduction position from the loop end point LE to the loop start point LS will be described with reference to time charts shown in FIGS. 9A and 9B. FIG. 10 is a time chart showing the loop playback realized by the audio playback apparatus of FIG. 7. Incidentally, FIGS. 9A and 9B are drafted to show the details of the loop playback in a section A1 shown in FIG. 10. Next, the details of the loop playback will be described below.

When the controller 140 performs loop playback on a series of compressive coded data read from a desired audio data file, it reads the data NLS representing the loop start point LS and the data NLE representing the loop end point LE from the header attached to the compressive coded data. Next, the controller 140 performs calculations using the data NLS and NLE in accordance with the foregoing equations (1) to (4), thus producing the foregoing data NBS, NBE, N1, and N2. Next, the controller 140 controls one of the decoders 121 and 122 to start decoding on the compressive coded data so as to reproduce a string of samples started from the phrase start point. In the case of FIG. 10, the controller 140 designates the decoder 121 to start decoding from the phrase start point. At this time, the controller 140 controls the selector 131 to select the output data of the decoder 121. Thus, the decoder 121 reproduces a string of samples started from the phrase start point, and the selector 131 selects such a sample string, which is supplied to the speaker 134 so as to produce the corresponding sound.

Thereafter, the controller 140 monitors the blocks and samples sequentially decoded and reproduced by the decoder 122 so as to predict the timing at which the decoder 121 reproduces the sample whose number is N2 counted from the first sample in the block NBE, that is, the sample of the loop end point LE. As shown in FIGS. 9A and 9B, the controller 140 determines the decoding start timing, at which the decoder 122 starts decoding on the block NBS including the loop start point LS and its following blocks, in order to make the decoder 122 reproduce the sample of the loop start point LS with a delay time TS depending upon the predicted timing of reproduction of the sample of the loop end point LE.

Specifically, the controller 140 sets time ΔT, which is calculated using the predicted timing of reproduction of the sample of the loop end point LE in accordance with an equation (5), as the timing at which the decoder 122 starts decoding on the block NBS, so that the decoder 122 starts decoding on the blocks counted from the block NBS.

$$\Delta T = (N1-2) \cdot TS + \tau 0 \quad (5)$$

In the equation (5), τ0 denotes a delay time by which the first sample of the block NBS is subjected to reproduction after the decoder 122 starts decoding of the block NBS.

After the decoder 122 starts decoding on the block NBS and its following blocks at the aforementioned timing, as shown in FIGS. 9A and 9B, the decoder 121 reproduces the sample of the loop end point LE, then, the time ΔT elapses, so that the decoder reproduces the sample of the loop start point LS. In the time period between the timing at which the decoder 121 reproduces the sample of the loop end point LE and the timing at which the decoder 122 reproduces the sample of the loop start point LS, the controller 140 performs switchover control on the selector 131, which is thus controlled to select the output of the decoder 122, i.e., a string of samples sequentially reproduced by the decoder 122 after the loop start point LS. Thus, the speaker 134 produces sound in correspondence with such a sample string counted from the loop start point LS. The aforementioned operation is realized in the section A1 shown in FIG. 10.

The aforementioned operation is similarly performed again so that the controller 140 controls the decoders 121 and 122 so as to alternately perform reproduction on the sample string belonging to the loop section. After completion of the repetitive reproduction of the sample string of the loop section by a prescribed number of times, the controller controls the prescribed decoder (i.e., the decoder 121, which presently performs decoding, see FIG. 10) to reproduce a series of samples until the phrase end point.

As described above, the present embodiment can realize the loop playback with respect to a desired loop section included in one phrase, thus repeatedly reproducing samples based on compressive coded data.

Figure 11:
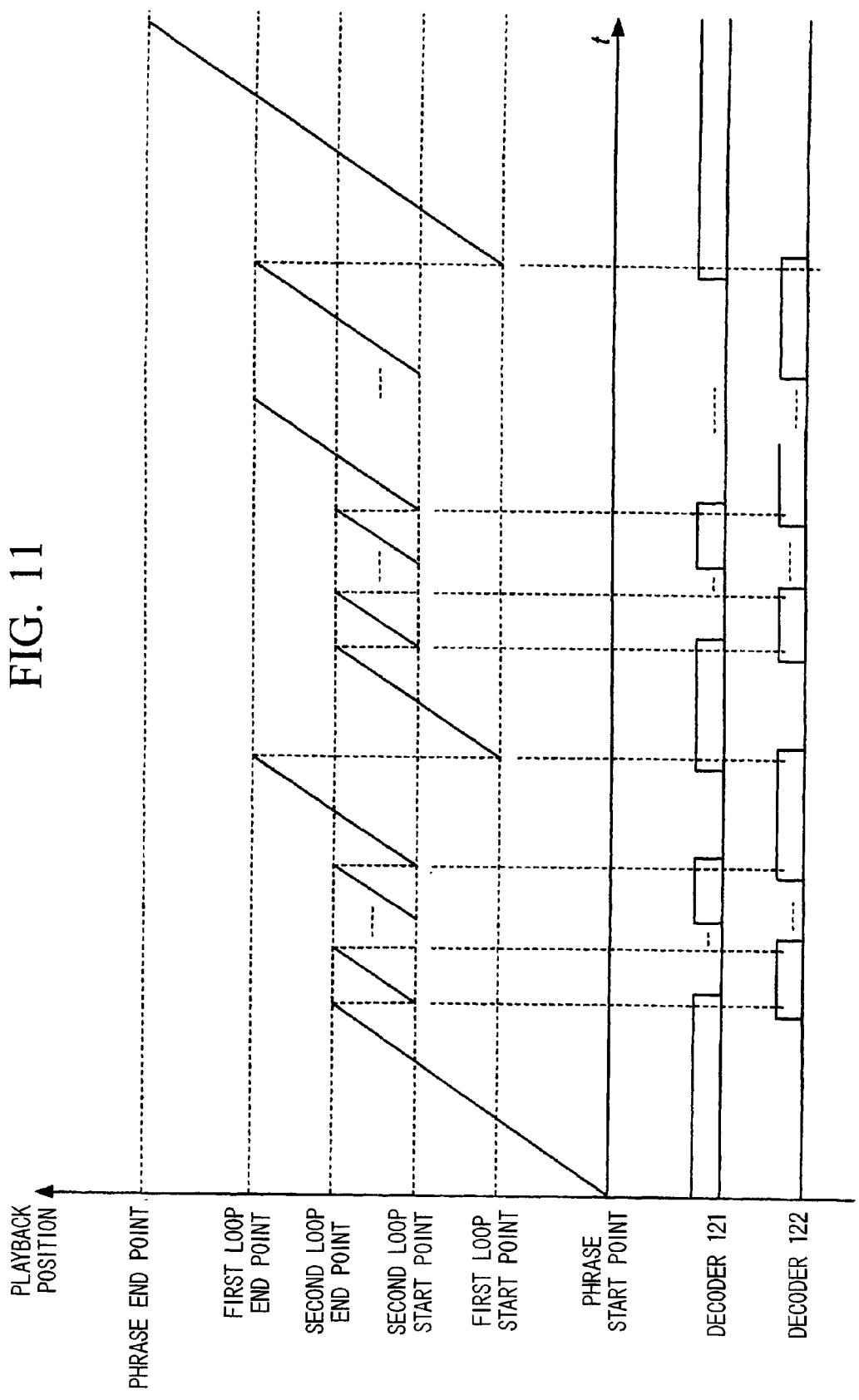
FIG. 11 is a time chart showing another example of the loop playback realized by the audio playback apparatus of FIG. 7.

FIG. 11 is a time chart for explaining another example of the loop playback realized by the audio playback apparatus of FIG. 7. This time chart is created under the condition in which one phrase includes a first loop section, which further includes a second loop section smaller than the first loop section. Even when one phrase includes a hierarchical structure of loop sections, the controller 140 controls the decoders 121 and 122 so as to alternately perform decoding on the loop sections. At this time the controller 140 returns the reproduction position from the second loop end point to the second loop start point, and it also returns the reproduction position from the first loop end point to the first loop start point. Such control executed by the controller 140 is similar to one that is described before with reference to FIGS. 9A and 9B.

The second embodiment can be modified in a variety of ways, which will be described below.

(1) It is possible for the decoders 121 and 122 to have a function of outputting 0s instead of reproduced samples (which are reproduced by way of decoding) upon reception of a MUTE instruction, whereby the selector 131 of the audio output device 130 is replaced by an OR gate. In this case, the controller 140 returns the reproduction position from the loop end point LE to the loop start point LS as follows:

First, the controller 140 controls one decoder (e.g., decoder 121) to start decoding on the block including the loop start point LS; then, the controller 140 issues a MUTE instruction so as to make the decoder 121 output 0s instead of reproduced samples. When the decoder 121 completes decoding of the sample preceding the loop start point LS, the controller 140 releases the MUTE instruction for the decoder 121 and then makes the decoder 121 reproduce a string of samples started from the loop start point LS. At the same time, the controller 140 sends a MUTE instruction to the other decoder (e.g., decoder 122).

(2) It is possible for the decoder 121 and 122 to have a temporary stop function for temporarily stopping decoding and a restart function for restarting decoding from the temporarily stopped condition. That is, each decoder can temporarily stop reproducing samples even in the middle of the block upon reception of a temporary stop instruction, so that it holds the contents of all registers used for decoding; thereafter, upon reception of a restart instruction, it restarts decoding using the held contents of the registers.

When the decoders 121 and 122 are designed to have the aforementioned functions, it is possible to reduce the load of the controller 140 in controlling the decoders 121 and 122. Specifically, the controller 140 returns the reproduction position from the loop end point LE to the loop start point LS in such a way that during the execution of the decoding of the block including the loop start point LS, one decoder (e.g., decoder 121) is controlled to temporarily stop decoding when the sample preceding the loop start point LS is reproduced. Then, just after the other decoder (e.g., decoder 122) reproduces the sample of the loop end point LE, the decoder 121 is controlled to restart decoding so as to reproduce a series of samples started from the loop start point LS. In this case, the timing at which the decoder 121 is controlled to start decoding of the block including the loop start point LS is not necessarily preceded by the aforementioned time ΔT from the predicted timing of reproduction of the sample of the loop end point LE, wherein it can be preceded by the time ΔT or more. This makes it easy for the controller 140 to perform timing control.

Lastly, the present invention is not necessarily limited to the aforementioned embodiments, variations, and modifications; hence, the present invention must be interpreted within the scope of the invention defined by the appended claims.

What is claimed is:

1. An audio playback apparatus comprising:
a memory for storing compressive coded data, which are produced by performing compressive coding on a string of samples forming an audio waveform of one phrase, wherein the compressive coded data includes a full section defined between a phrase start point and a phrase end point and a loop section defined between a loop start point and a loop end point;
a first decoder;
a second decoder; and
a controller for controlling the first decoder in such a way that upon reception of a normal playback instruction, the first decoder sequentially decodes the full section of the compressive coded data, and
wherein the controller controls the first decoder and the second decoder in such a way that upon reception of a loop playback instruction, the first decoder sequentially decodes the full section of the compressive coded data so as to reproduce and output the samples from the phrase start point, the first decoder stops outputting the samples when the first decoder is instructed to mute, the second decoder repeatedly decodes the loop section of the compressive coded data so as to repeatedly reproduce and output the samples lying between the loop start point and the loop end point, and the first decoder restarts decoding on the full section of the compressive coded data so as to sequentially reproduce and output the samples toward the phrase end point.

2. An audio playback apparatus comprising:
a memory for storing compressive coded data, which are produced by performing compressive coding on a string of samples forming an audio waveform of one phrase, wherein the compressive coded data includes a full section defined between a phrase start point and a phrase end point and a loop section defined between a loop start point and a loop end point;

a first decoder;

a second; and a controller for controlling the first decoder and the second decoder in such a way that upon reception of a loop playback instruction, the first decoder is activated to perform decoding on the full section of the compressive coded data so as to sequentially reproduce and output the samples from the phase start point, the first decoder stops outputting the samples while holding the samples therein, the second decoder is activated so as to repeatedly perform decoding on the loop section of the compressive coded data so as to repeatedly reproduce and output the samples lying between the loop start point and the loop end point a prescribed number of times, and the second decoder is instructed to mute and the first decoder is activated again so as to restart decoding on the full section of the compressive coded data so as to sequentially reproduce and output the samples toward the phrase end point.

3. An audio playback apparatus comprising:

a memory for storing compressive coded data, which are produced by way of compressive coding performed on a string of samples forming an audio waveform of one phrase, which is divided into a plurality of blocks and in which a phrase start point, a phrase end point, a loop start point, and a loop end point are defined, wherein the compressive coding is performed in units of the blocks;

a first decoder;

a second decoder; and a controller for controlling the first decoder and the second decoder so as to decode the compressive coded data, wherein upon reception of a loop playback instruction, the controller controls the first decoder to start decoding on the compressive coded data so as to reproduce the samples started from the phrase start point, then, the controller alternately controls the first decoder and the second decoder to alternately reproduce the samples lying between the loop start point and the loop end point so that reproduction of the samples are repeated a predetermined number of times in total, and wherein one of the first decoder and the second decoder starts decoding of the compressive coded data of the block including the loop start point before the other of the first decoder and the second decoder reproduces the sample of the loop end point, then the one of the first decoder and the second decoder starts reproducing the samples started from the loop start point without delay.

4. An audio playback apparatus according to claim 3, wherein the controller determines a timing at which the other of the first decoder and the second decoder starts decoding on the compressive coded data of the block including the loop start point in such a way that the other of the first decoder and the second decoder reproduces the sample of the loop start point just after the one of the first decoder and the second decoder reproduces the sample of the loop end point.

5. An audio playback apparatus according to claim 3, wherein both of the first decoder and the second decoder have a temporary stop function for temporarily stopping decoding and a restart function for restarting decoding, and wherein the controller controls the first decoder and the second decoder in such a way that the one of the first decoder and the second decoder temporarily stops the decoding after reproducing a sample preceding the loop start point, then, just after the other of the first decoder and the second decoder reproduces the sample of the loop end point, the one of the first decoder and the second decoder restarts the decoding so as to reproduce the samples started from the loop start point.

6. An audio playback apparatus comprising:

a memory for storing compressive coded data, which are produced by way of compressive coding performed on a string of samples forming an audio waveform of one phrase, which is divided into a plurality of blocks and is defined between a phrase start point and a phrase end point and which includes at least one loop section defined between a loop start point and a loop end point, wherein the compressive coding is performed in units of the blocks;

a first decoder;

a second decoder; and a controller for controlling the first decoder and the second decoder so as to decode the compressive coded data, wherein upon reception of a loop playback instruction, the controller controls the first decoder to start decoding on the compressive coded data so as to reproduce the samples started from the phrase start point, then, the controller alternately controls the first decoder and the second decoder so as to repeatedly reproduce the samples belonging to the loop section a predetermined number of times, and wherein the second decoder starts decoding of the compressive coded data of the block including the loop start point before the first decoder reproduces the sample of the loop end point in such a way that subsequent to reproduction of the sample of the loop end point by means of the first decoder, the second decoder starts reproducing the samples started from the loop start point without delay, wherein both of the first decoder and the second decoder have a temporary stop function for temporarily stopping decoding and a restart function for restarting decoding, and wherein the controller controls the first decoder and the second decoder in such a way that during execution of decoding of the compressive coded data of the block including the loop start point, the first decoder temporarily stops the decoding after reproducing a sample preceding the loop start point, then, just after the second decoder reproduces the sample of the loop end point, the first decoder restarts the decoding so as to reproduce the samples started from the loop start point.

* * * * *